United States Patent [19]

Bassett et al.

[11] Patent Number: 5,240,080

[45] Date of Patent: Aug. 31, 1993

[54] ADJUSTABLE ATTACHMENT FOR MOUNTING A FARMING TOOL ON A DRAWING VEHICLE

[75] Inventors: James H. Bassett, Sycamore; Stephen Faivre, DeKalb, both of Ill.

[73] Assignee: Dawn Equipment Company, Sycamore, Ill.

[21] Appl. No.: 660,675

[22] Filed: Feb. 25, 1991

[51] Int. Cl.$^5$ .................. A01B 23/00; A01B 25/00
[52] U.S. Cl. .................. 172/740; 172/739; 111/119; 111/124
[58] Field of Search .................. 172/720, 739, 740; 111/118, 120, 124, 119, 69, 152, 149, 174, 123; 403/87, 91-93, 117

[56] References Cited

U.S. PATENT DOCUMENTS

| | | | |
|---|---|---|---|
| 1,134,462 | 4/1915 | Kendrick | 403/93 |
| 1,901,778 | 3/1933 | Schlag | 403/92 |
| 2,777,373 | 1/1957 | Pursche | 172/740 X |
| 3,010,744 | 11/1961 | Hollis | 172/740 X |
| 3,038,424 | 6/1962 | Johnson | 111/124 |
| 3,539,020 | 11/1970 | Andersson | 172/740 |
| 3,581,685 | 6/1971 | Taylor | 111/124 |
| 4,445,445 | 5/1984 | Sterrett | 111/120 X |
| 4,825,959 | 5/1989 | Wilhelm | 172/720 |

FOREIGN PATENT DOCUMENTS 530673 9/1956 Canada .................. 111/124

OTHER PUBLICATIONS

Buffalo Farm Equipment Catalog—Model 4620.
"The New Farm"—Feb. 1991, p. 6.
Buffalo Farm Equipment All-Flex Cultivator Operator Manual.
Hiniker 5000 Cultivator Brochure.
Yetter Catalog.
Orthman Manufacturing, Inc., Rowcrop Cultivator booklet.
Hiniker Series 5000 Row Cultivator Rigid and Folding Toolbar Operator's Manual.

*Primary Examiner*—Dennis L. Taylor
*Assistant Examiner*—Jeffrey L. Thompson
*Attorney, Agent, or Firm*—Wood, Phillips, VanSanten, Hoffman & Ertel

[57] ABSTRACT

The present invention is directed to an adjustable attachment for mounting a tool to a tow bar. A shank having first and second spaced parts has a bracket for attaching the first shank part to a tow bar in an operative position thereon so that the shank may follow the movement of a drawing vehicle. A structure is provided for attaching a tool to the second shank part. The second shank part, with a tool attached thereto, is spaced below the first shank part with the tool in its operative position. A pivotal joint joins the first and second shank parts. At least one threaded bolt having a threaded shaft with two ends and a head at one end and a free end at the other end threadably engages a threaded receptacle. The threaded receptacle is positioned such that the free end of the shaft prevents the pivoting of the second shank part in at least one of a clockwise or counterclockwise direction.

16 Claims, 2 Drawing Sheets

ADJUSTABLE ATTACHMENT FOR MOUNTING A FARMING TOOL ON A DRAWING VEHICLE

BACKGROUND OF THE INVENTION

1. Technical Field

The present invention is directed toward farm implements, and more particularly toward an adjustable attachment for mounting a tool to a tow bar on a tractor

2. Background Art

Attachments for mounting tools to a tow bar on a drawing vehicle such as a tractor are well known in the art. Typically these attachments consist of an elongate shank having a first and a second end, a bracket for fastening the first end of the shank to a tow bar and structure for fastening a farming tool at the second end of the shank.

As is well known in the art, in order to obtain the most efficient function from a wide variety of soil cultivation and fertilization equipment an adjustment device must be provided with the farm tool attachment for adjusting the position of the tool on the attachment relative to the tow bar. For example, it is known in the art that tools for distributing gaseous fertilizers such as anhydrous ammonia into soil are most effective when the tools pass through the soil with a minimum amount of cracking and fracturing of the soil, the cracks and fractures providing a path for the fertilizer to escape into the atmosphere. Thus, the prior art teaches an adjustment device for adjusting the tools relative to the tow bar to minimize the disruption of the soil.

A specific example of a structure for distributing gaseous fertilizers into soil known in the art consists of a vertically oriented shank having a first and a second end, a bracket for fastening the first end of the shank to a tow bar and a fertilizer distributor attached to the second end of the shank. The fertilizer distributor may be, for example, a "V"-shaped, plow or blade structure formed by two elongate leg members each having a first and a second end, the first ends joined to form the apex of the V and the second ends spaced apart to form the mouth of the V. The "V"-shaped blade is attached to the second end of the shank at the apex of the V. Metal tubes for distributing fertilizer have outlets near the second ends of the legs.

It is known that when the "V"-shaped blade is not adjusted to form a plane substantially parallel to a plane formed by the surface of the soil the effective cross-sectional area of the path formed by the blade and shank is greater than the cross-sectional area of the actual shank and blade. Thus soil disruption is increased and the formation of excessive cracking and fissures results which allows for highly undesirable escape of gaseous materials.

To address this problem, prior art devices have provided an adjustment device for leveling a "V"-shaped blade. One such prior art adjustment device for leveling a "V"-shaped blade provides the vertical shank with a pivot point at the bracket and an adjustable stop for halting the pivot of the shank at the top of the bracket. Using this structure the "V"-shaped blade may be set in a plurality of fixed positions relative to the tow bar.

A second prior art adjustment device for leveling a "V"-shaped blade consists of a vertical shank divided into lower and upper shank parts. The lower and upper shank parts are joined by a pivot joint. The lower shank part further includes opposing arcuate grooves located away from the pivot joint. A threaded bolt is fixedly secured within the upper shank part such that the shaft of the threaded bolt fixedly engages the upper shank part. The lower shank part may be pivoted relative to the upper shank part when the threaded bolt is in an untightened position and the grooves will slide over the threaded bolt. The threaded bolt can be tightened to frictionally secure the lower shank part relative to the upper shank part.

The first prior art structure has numerous drawbacks. First, the distance between the tow bar and the "V"-shaped blade (known as the trash clearance) results in a significant torque being applied to the adjustable stop as the "V"-shaped blade is driven through the soil. This torque is significantly increased if the "V"-shaped blade or the shank strike a rock or other obstruction. In addition, the adjustable stop is in an exposed position as it rides on the top of the tow bar, thus being susceptible to being forced out of adjustment or damaged by crops or other obstructions as the fertilizer distributor is used.

To minimize the moment arm for the blade and thereby reduce the stress on the adjustable stop and the pivot point prior art designers have reduced the length of the shank. However, this solution merely exacerbates the potential interference with the adjustable stop as more obstructions are likely to be encountered closer to the ground. Moreover, this option may not be available if the height of the tow bar cannot be reduced.

The second type of prior art leveling adjustment is deficient because it relies upon frictional forces to pivotly secure the lower segment relative to the upper segment. Frictional forces are inadequate to pivotly secure the lower segment relative to the upper segment when the tool engages a significant obstruction such as a large rock. Moreover, the degree of tightening of the bolt necessary to maximize the frictional force requires great effort in the field and may lead to stripping the threaded bolt and thus failure of the adjustment device.

Prior art fertilizer distributors have problems in addition to those discussed above with respect to leveling adjustments. Most notably, the fertilizer distributing tubes of the prior art structures typically are metal tubes welded or bracketed to the shank or the "V"-shaped blade. Those structures welding the metal tubes to the shank or "V"-shaped blade have the problem that the tubes are difficult to replace once they are damaged or worn. Those structures using brackets to secure the metal tubes permit the brackets to protrude into the soil as the fertilizer distributor is run through the soil, exposing the brackets to wear and increasing the cross-sectional area of the path as the distribution tool passes through the soil.

SUMMARY OF THE INVENTION

The present invention is directed toward overcoming one or more of the problems discussed above.

The present invention is directed to an adjustable attachment for mounting a tool to a tow bar. A shank having first and second spaced parts has a bracket for attaching the first shank part to a tow bar in an operative position thereon so that the shank may follow the movement of a drawing vehicle. A structure is provided for attaching a tool to the second shank part. The second shank part, with a tool attached thereto, is spaced below the first shank part with the tool in its operative position. A pivotal joint joins the first and second shank parts. At least one threaded bolt having a threaded shaft with two ends and a head at one end and a free end at the other end threadably engages a threaded receptacle. The threaded receptacle is positioned such that the free end of the shaft prevents the pivoting of the second shank part in at least one of a clockwise or counter-clockwise direction.

The adjustable attachment of the present invention may be in combination with a tool for passing through a particulate matter such as soil as it follows the movement of a drawing vehicle. The tool may be a fertilizer distributor having a member transverse to the length of the shank and a structure for distributing fertilizer from a supply. The structure for distributing fertilizer from a supply may be a distribution tube with spaced ends, the distribution tube having an inlet at one end and an outlet at the other end. Such a tube conforms to the trailing edge of the shank and the transverse member to be shielded thereby in use, the outlet being proximate the transverse member away from the shank. The transverse member may include a pair of legs each having a first and a second end, the first ends of the legs being joined and the second ends of the legs spaced apart to form the legs into a planar "V"-shaped blade. The blade has a top and a bottom surface and a leading and a trailing edge, the leading edge of the blade having the apex of the "V".

Another aspect of the present invention is a distribution tube for distributing additive to soil, the distribution tube being attachable to a distribution implement having a vertical shank with a first and a second end. A transverse leg for passing through a particulate matter is attached to the second end and a bracket for attaching the vertical shank to a tow bar attached to a drawing vehicle such as a tractor is attached to the first end. The vertical shank and the transverse leg have a leading and trailing edge, with a fastener for attaching the distribution tube at the trailing edge. The distribution tube is a tubular body having an inlet portion and an outlet portion divided by a preformed bend, the angle between the inlet portion and the outlet portion being less than 90°. The tubular body conforms to a trailing edge of a shank and a transverse member such that the shank and the transverse member protect the tubular body from abrasion once the distribution tube is attached to the trailing edge of the shank and the transverse member by the fasteners and the shank and the transverse member pass through a particulate matter, the outlet being proximate an end of the transverse member away from the shank.

Yet another aspect of the present invention is a fertilizer distribution tool having a shank with a top and a bottom and a leading and a trailing edge. A pair of legs are attached to the bottom of the shank. Each leg has a first and a second end, the first ends of the legs being joined such that the legs form a planar "V"-shaped blade. The blade has a top and a bottom surface and a leading and a trailing edge. The leading edge of the blade has the apex of the "V", and the blade is attached to the bottom of the shank at the top part of the apex of the "V". A conduit having an inlet portion on the trailing edge of the shank in an outlet portion on the trailing edge of at least one of the legs of the blade is attached to the trailing edge of the shank and at least one of the legs of the blade. The trailing edge of the shank and the trailing edge of at least one of the legs of the blade form a portion of the conduit.

The present invention provides an adjustable attachment for mounting a tool to a tow bar that reduces the moment arm between the tool and point of adjustment relative to the tow bar. The present invention further provides an adjustable attachment for mounting a tool to a tow bar wherein the adjustment device for changing the position of a tool mounted thereon is located in a position protected from disruption or damage as the attachment is used. In addition, the adjustable attachment of the present invention holds the position of a tool mounted thereon by direct contact of the end of a positioning bolt with the second shank part providing a surer setting than prior art devices relying upon friction for holding the position of a tool mounted thereon. Moreover, the present invention provides a distribution tube for use with a fertilizer distributor tool that conforms to and resides downstream and in the wake of a trailing edge of the tool to minimize the combined effective cross-sectional area (and, therefore, the soil disruption) of the tool and tube and to minimize the tube's contact with abrasive elements through which the tube and tool are passed.

Other objects, advantages and features of the present invention will become apparent from a consideration of the following specification taken in conjunction with the accompanying drawings.

DETAILED DESCRIPTION OF THE PREFERRED EMBODIMENT

Figure 1:
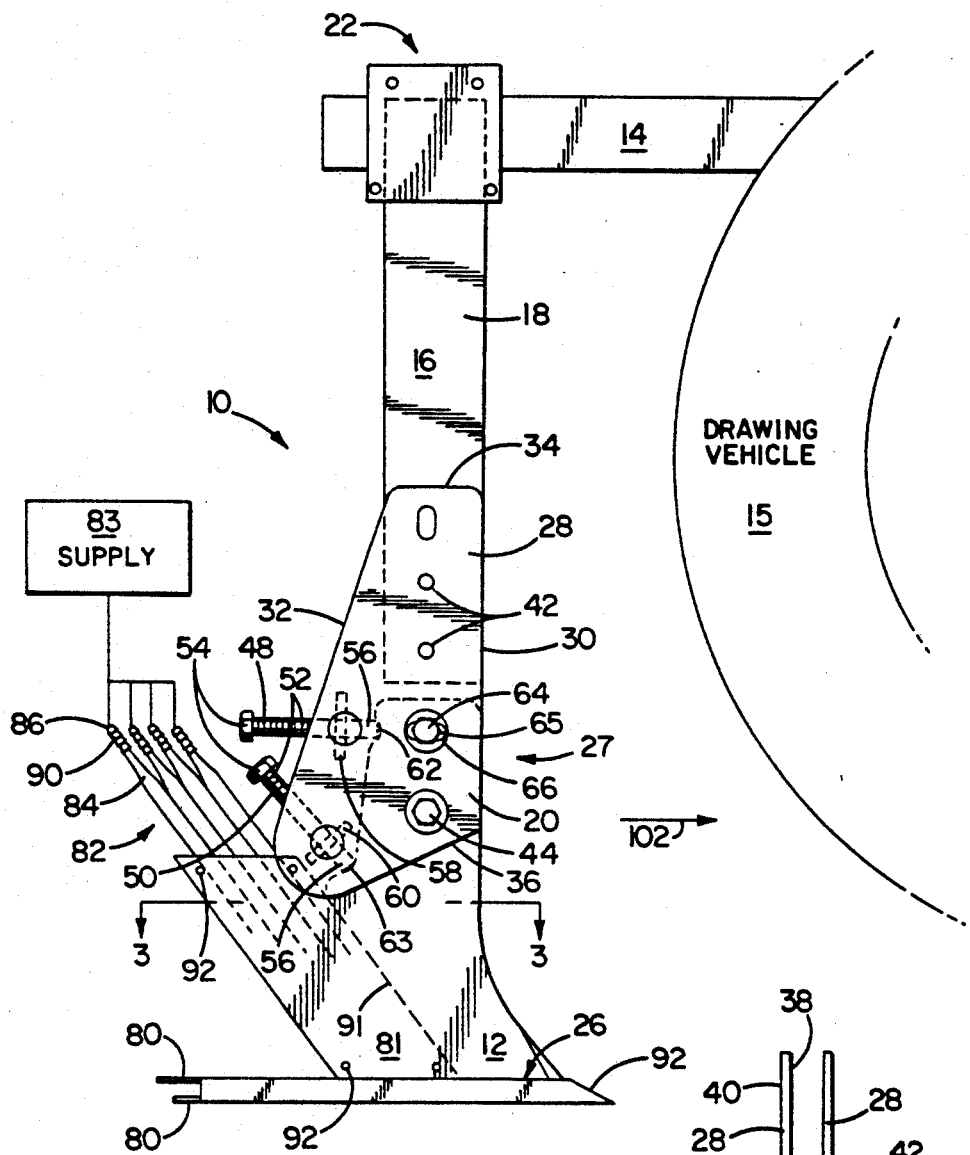
FIG. 1 is a side elevation view of an adjustable attachment for mounting a tool to a tow bar according to the present invention including a fertilizer distributor disposed thereon.

An adjustable attachment 10 for mounting a transverse member or tool 12 to a tow bar 14 is illustrated in FIG. 1. The tow bar 14 is conventionally attached to a drawing vehicle, such as a tractor, shown schematically at 15. The adjustable attachment 10 consists of a shank 16 having a first shank part 18 and a second shank part 20, the first shank part 18 and the second shank part 20 being spaced apart from each other. A fastening structure 22 for fastening the first shank part 18 to a tow or tool bar 14 in an operative position thereon is provided on the first shank part 18. The fastening structure 22 is preferably a vertical extension of the first shank part 18 which connects to the tow bar 14. The fastening structure 22 may be any of the many fastening mechanisms known to those skilled in the art.

The tool 12 is attached to the second shank part 20 by any fastener 26 known to those skilled in the art. Preferably, the fastener 26 adds minimally to the frontal cross-sectional area of the adjustable attachment 10. Preferably, the fastener 26 is a weld.

As clearly illustrated in FIG. 1, when the attachment 10 including the tool 12 is in its operative position, the second shank part 20 and the tool 12 attached thereto are below the first shank part 18 and the tow bar 14.

Figure 2:
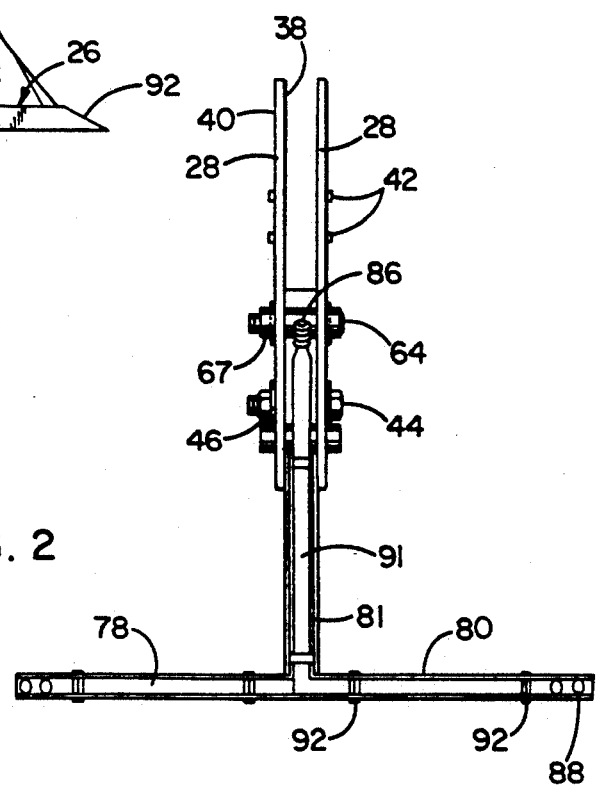
FIG. 2 is a rear elevation view of the adjustable attachment of FIG. 1.

Located intermediate the first shank part 18 and the second shank part 20 is an adjustment device 27 for changing the position of the tool 12 relative to the position of the first shank part 18. Preferably, the adjustment device 27 includes a pair of spaced apart mounting plates 28. Each plate 28 has a leading edge 30 and a trailing edge 32, a top 34, a bottom 36 and an inside surface 38 and an outside surface 40. As best seen in FIGS. 1 and 2, the plates are rigidly attached to opposite sides of the shank 16. The inner surfaces 38 of the mounting plates 28 capture the shank 16 and are urged together by a pair of mounting bolts 42 secured by a pair of nuts (not shown). The second shank part 20 is pivotably secured to the mounting plates 28 through a bolt 44 secured by a nut 46 passing through a hole (not shown) in the second shank part 20 and each of the mounting plates 28 proximate the bottom 36 of the mounting plates 28. First and second adjustment bolts 48, 50 are disposed intermediate the rear edges 32 of the mounting plates 28. Each of the first and second adjustment bolts 48, 50 has a threaded shaft 52 with a manipulating head 54 at one end and a free end 56 at the other end. The first and second adjustment bolts 48, 50 are threadably secured between the mounting plates by first and second threaded securing plates 58, 60 mounted between the mounting plates 28. As best seen in FIG. 1, the second shank part 20 has a first ridge 62 located above the pivotable bolt 44 for engaging the free end 56 of the first bolt 48. Similarly, the second shank part has a arcuate ridge 63 for receiving the free end 56 of the second adjustment bolt 50. Finally, a bolt 64 passes through a hole 65 away from the pivoting bolt 44 and an arcuate slot 66 in the second shank part 20. The bolt 64 threadably engages a nut 67.

In a preferred embodiment, the adjustable attachment 10 is attached to a tool 12, the tool 12 being a fertilizer distributor. A broad range of soil cultivation and fertilization equipment needing leveling are equally well suited for use with the adjustable attachment 10.

Figure 3:
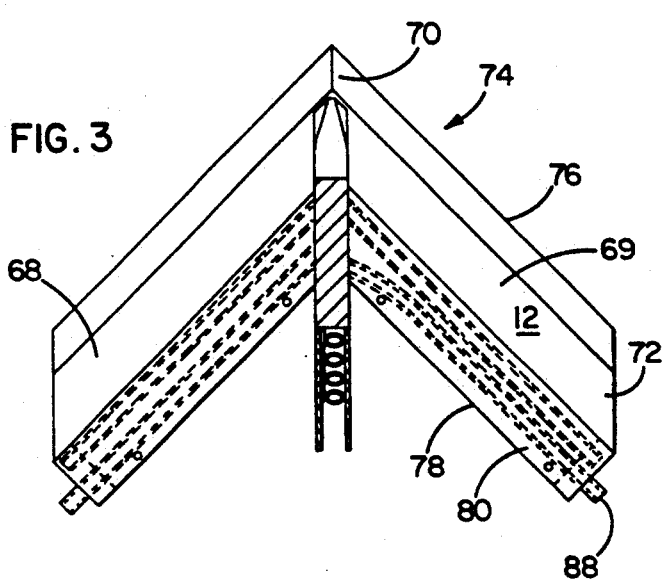
FIG. 3 is a sectional view of the adjustable attachment taken along 3—3 of FIG. 1.

As best seen in FIGS. 1 and 3, the fertilizer distributor 12 has a pair of planar legs 68 and 69 each having a first and second end 70, 72. The first ends 70 of the planar legs 68, 69 are joined and the second ends of the planar legs 68, 69 are spaced apart to form a V-shaped knife or blade 74. The "V"-shaped blade 74 has a leading edge 76 and a trailing edge 78, the leading edge 76 containing the apex 79 of the "V"-shaped blade 74. As seen in FIGS. 1, 2 and 3, protective plates 80, 81 are attached to the trailing edge 78 of the "V"-shaped blade 74. The protective plates 80, 81 protect distribution tubes 82 for distributing an additive or fertilizer from abrasion by particulate matter as will be apparent below.

The preferred embodiment includes distribution tubes 82 for distributing an additive or fertilizer from a supply 83. The distribution tubes 82 have an inlet 86 at one end and an outlet 88 at the other end. The inlet 86 of each tube 82 has a plurality of annular ridges or barbs 90 for receiving the interior surface of a supply tube from a supply source (supply tube not shown). As best seen in FIGS. 1, 2 and 3, the distributing tubes 82 conform to the trailing edge 91 of the shank 16 and the trailing edge 78 of the "V"-shaped blade 74. Even more preferred, the distributing tubes 82 lie within the protective plates 80 and 81 along the trailing edge 91 of the shank 16 and the trailing edge 78 of the "V"-shaped blade 74. The outlets 88 of the tubes 82 are disposed at the trailing edge 78 of the "V"-shaped blade member 74 away from the second shank part 20, preferably at the second end of the planar legs 68, 69. The plurality of distributing tubes 82 are held in place within the protective plates 80, 81 by a plurality of roll pins 90.

In the preferred embodiment the leading edge 76 of the "V"-shaped blade 74 member is a wedge or blade-like configuration 92 best illustrated in FIG. 1.

The shank 16, the mechanism for fastening 26, the "V"-shaped blade member 74 and all the attachments including the mounting plates 28, the adjustment screws 48, 49, nuts 46, 47, the bolts 44, 64 and the protective plates 80, 81 are preferably made of steel. The distributing tubes 82 are preferably made of a plastic which can resiliently absorb a blow or a bend without permanent deformation and without obstructing the passage formed by the tube. A nylon material has been found to yield superior results; however, any plastic, nylon or similar material is suitable for forming the tubes, provided the material is resistant to corrosion by moisture, fertilizers or other additives and can distribute anhydrous ammonia and other gaseous fertilizers at temperatures in the range of 0° Fahrenheit and pressures in the range of 30 psi while still maintaining the desired flexibility resilient characteristics. Metal, including steel, distribution tubes 82 may also be used in the present invention.

Figure 4:
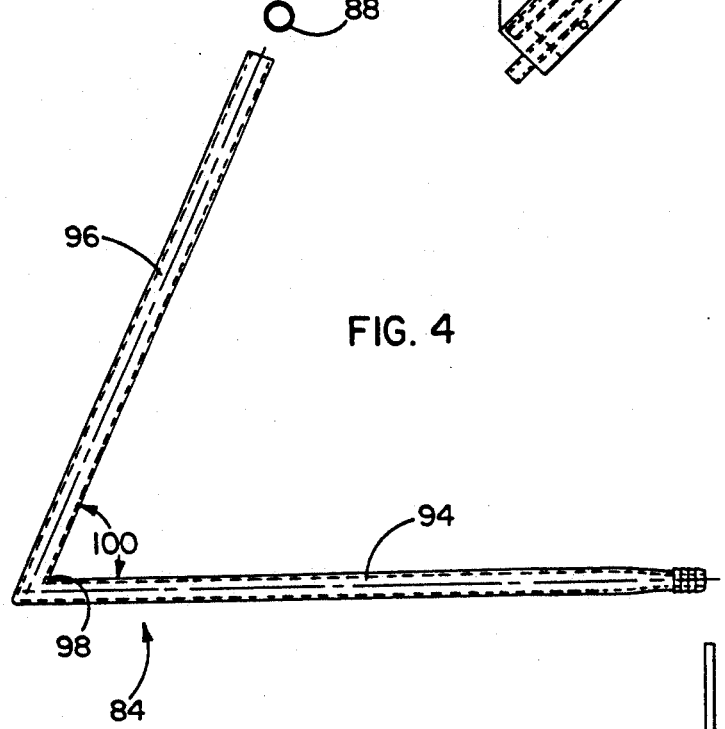
FIG. 4 is a side view of a preferred form of distribution tube on the fertilizer distributor in FIGS. 1-3.

In a highly preferred embodiment, the distributing tubes 82 are preformed as illustrated in FIG. 4. The preformed distributing tubes 82 conform to the trailing edges 91, 78 of the shank 16 and the "V"-shaped blade 74. An inlet portion 94 and an outlet portion 96 of the distribution tubes 82 are formed by a bend 98. The angle 100 between the inlet portion 85 and the outlet portion 86 is preferably less than 90°, with an angle of 65 being favored in the preferred embodiment. With this structure, quick and easy replacement of the distributing tubes 84 is facilitated.

Figure 5:
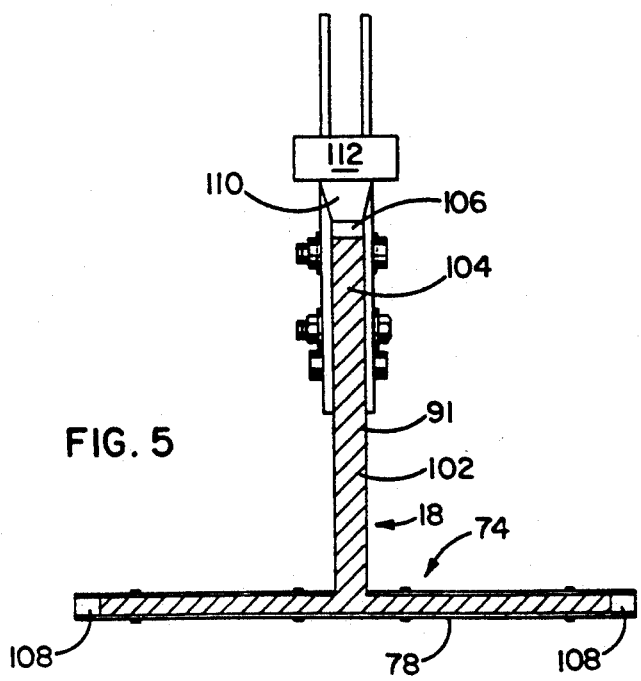
FIG. 5 is a rear elevation view of the adjustable attachment of FIG. 1 illustrating a conduit formed in part from the trailing edge of the "V"-shaped blade and the shank.

Another embodiment of the fertilizer distributor is illustrated in FIG. 5. A sealing plate 102 covers the space between the protective plates 80, 81 at their respective trailing edges 78. The sealing plate 102 along with the trailing edge 78 of the "V"-shaped blade 74, the trailing edge 91 of the second shank part 18 and the protective plates 80, 81 form a conduit 104. The conduit 104 has an inlet portion 106 on the trailing edge 91 of the second shank part 18. The conduit 104 has outlet portions 108 at the trailing edge 78 of the "V"-shaped blade 74. An adaptor 110 connects the fertilizer distributor 12 to a slurry supply 112. Using this embodiment, the conduit 104 obviates the need for distribution tubes 82.

The adjustable attachment 10 for mounting a tool 12 of the present invention is deployed by mounting the first shank part 18 to a tow bar 14 by engaging the fastening structure 22 to a tow bar 14. Upon mounting the adjustable attachment 10, a tool 12 such as the "V"-shaped blade 74 attached to the second shank part 20 may be adjusted by manipulating the adjustment device 27.

More particularly, if upon mounting the attachment 10 to the tool bar 14 the apex 79 of the "V"-shaped blade member 74 lies either above or below the trailing edge 78 of the "V"-shaped blade 74, the adjustment device 27 can be adjusted so that the apex of the blade 79 lies in the same plane as the trailing edge 78 of the "V"-shaped blade 74, thus minimizing the effective cross-section of a path made by the "V"-shaped blade 74 as it passes through a particulate matter such as soil.

In some instances the force of dragging the "V"-shaped blade 74 through the soil will impart a sufficient torque to the shank 16 or the tow bar 14 that the apex 79 of the "V"-shaped blade 74 will lie below the plane of trailing edge 78. Under such circumstances, it may necessary to have the apex 79 of the "V"-shaped blade 74 above the plane of the trailing edge 78 while the "V"-shaped blade 74 is stationary so that the apex 79 and the trailing edge 78 of the "V"-shaped blade 74 will be in the same plane when the "V"-shaped blade 74 is dragged through soil.

The apex 79 of the "V"-shaped blade 74 may be elevated relative to a trailing edge 78 of the "V"-shaped blade 74 as follows: First the nut and bolt 44, 46 are loosened slightly. Next the nut and bolt 64, 67 are loosened slightly. Then, the first adjustment bolt 48 is unscrewed from the threaded securing plate 58 and the second adjustment bolt 50 is screwed into the second threaded screwing plate 60. The free end 56 of the second adjustment bolt 50 thereby engages the arcuate ridge 64 and causes the second shank part 20 to pivot about the pivot bolt 44, thus causing the apex 79 of the "V"-shaped blade 74 to be raised relative to the tow bar 14 and the trailing edge 78 of the "V"-shaped blade member 74. When the leading edge 76 has been raised to the desired amount, the first adjustment bolt 48 is screwed into the first threaded screwing plate 58 until the free end 56 of the second adjustment bolt 50 engages the arcuate groove 62, thus rigidly securing the second shank part 20 relative to the first shank part 18. The securing nut and bolt 64, 67 are then tightened as are the pivotable bolt 44 and its associated nut 46. To lower the apex 79 of the "V"-shaped blade member 74 relative to the tow bar 14 and the trailing edge 78 of the "V"-shaped blade member 74, the above-described process is substantially repeated, only the second adjustment bolt 50 is first unscrewed from the second securing threaded securing plate 60 and the first adjustment bolt 48 is then screwed into the first threaded screwing plate 58.

The distribution tubes 82 may be readily replaced by removing the roll pins 90.

When the preferred embodiment of the present invention is used to distribute an additive such as fertilizer in a particulate matter such as soil the tow bar 14 is pulled by a drawing vehicle 15 such as a tractor in the direction of the arrow 102 indicated in FIG. 1. As the shank 16 and the "V"-shaped blade member 74 are drawn a wake essentially void of soil is formed at the trailing edge 78 of the "V"-shaped blade 74 and the trailing edge 91 of the shank 16. The protective plates 80, 81, further act to assure that the space immediately behind the trailing edges 78, 91 of the "V"-shaped blade member 74 and the shank 16 remains void of material. The distributing tubes 84 and the protective plates 80, 81 do not increase the cross-sectional area of the "V"-shaped blade 74 and the shank 16 as illustrated in FIG. 2. Therefore, the shank and the "V"-shaped blade may pass through the soil with a minimum of disruption or cracking to the soil, thus insuring that a gaseous fertilizer distributed to the soil is less likely to leak into the atmosphere through a crack or fissure created by the action of the shank 16 and the "V"-shaped blade 74 being dragged through the soil.

The embodiment of the fertilizer distributor 12 having the conduit 104 in place of the distribution tubes 82 is particularly well suited to distributing slurries and solutions having a high percentage of undissolved solids because the conduit 104 has a larger cross-section than the distribution tubes 82. Slurry from a slurry supply 112 is channeled through the adaptor 110, into the inlet portion 106 and into the soil through the outlet portions 108. Obviously, this embodiment of the fertilizer distributor 12 may be used in combination with the adjustable attachment 10 to allow for the minimization of soil disruptions. This particular embodiment of the fertilizer distributor may be very useful in currently developing fertilization application techniques where phosphorus, potassium and nitrogen are applied below the surface of the soil yet near 30 the optimum position for plant use: about 4 inches deep By using the adjustable attachment 10 of the present invention, the user can assure that the "V"-shaped blade member 74 will pass through the soil in a plane parallel to that formed by the surface, thus minimizing the cross-sectional area of the path of the "V"-shaped blade member 74 and thereby minimizing disruption of the soil so as to decrease the likelihood that a gaseous fertilizer distributed by the distributing tubes 82 escaping from the soil. Should the "V"-shaped blade portion 74 and the second shank portion 20 encounter significant resistance as they pass through the soil, such as may occur when the blade strikes a rock, the adjustment means 27 will be subjected to a lesser torque than prior art devices because of the decreased length of the lever arm resulting from locating the adjustment means 27 intermediate the tow bar 14 and the "V"-shaped blade member 74. Moreover, because the ends of the adjustment bolts 48, 50 act directly upon the second shank part 22, the adjustment bolts hold the second shank part 20 in place more securely then prior art devices having only a friction force pivotly securing the second shank part. The adjustment means 27 is also protected from interference by obstructions by being located on the trailing edge 91 of the second shank part 20.

The preferred distributing tubes 82 are resistant to corrosive effects of moisture and the materials they distribute because they are made of plastic or nylon. Also, such distribution tubes 84 are more resistant to damage by bending or deformation because of the flexibly resilient nature of their walls. Distribution tubes 82 made of nylon or metal are protected from the abrasive effects of the soil they pass through by virtue of the substantially soil free wake formed at the trailing edges 78, 91 of the "V"-shaped blade 74 and the second shank part 20 and the fact that the distribution tubes 82 conform to the trailing edges. Moreover, because the distributing tubes 82 conform precisely to the trailing edges 78, 91 of the "V"-shaped blade 74 and the second shank portion 20, soil disruption is minimized as is abrasion to the tube members 82. Lastly, the outlets 88 of the distributing tubes 82 are less likely to become clogged by soil or other particulate matter.

The foregoing sets forth a preferred embodiment of the invention. Those skilled in the art will appreciate that the details herein given may be varied without departing from the true spirit and scope of the appending claims.

I claim:

1. An adjustable attachment for mounting a tool to a tow bar on a drawing vehicle such as a tractor, the tow bar attachment comprising:

a shank having a leading and a trailing edge and first and second spaced parts;

means for attaching the first shank part to a tow bar in an operative position thereon so that the shank follows movement of a drawing vehicle;

means for attaching a tool to the second shank part, said second shank part and a tool attached thereto being spaced below the first shank part with the tool in its operative position thereon;

a pivotable joint between the first and second shank parts for allowing pivoting of the second shank part relative to the first shank part about an axis in first and second opposite directions; and first and second means on the shank for engaging one of the leading and trailing shank edges for limiting pivoting of the second shank part in both the first and second opposite directions relative to the first shank part, said first and second engaging means both engaging the same edge.

2. The adjustable attachment for mounting a tool to a tow bar of claim 1 in combination with a tool for passing through a particulate matter such as soil as it follows the movement of a drawing vehicle.

3. The combination of claim 2 wherein the shank has an elongate configuration and the tool is a fertilizer distributor, the fertilizer distributor comprising:

a member transverse to the shank attached to the shank; and means for distributing fertilizer from a supply.

4. The combination of claim 3 wherein the transverse member has a leading and a trailing edge corresponding to the leading and trailing edge of the shank, the means for distributing comprising:

a fertilizer distribution tube, the distribution tube having an inlet at one end and an outlet at the other end, the tube conforming to the trailing edge of the shank and the transverse member, the outlet being proximate the transverse member away from the shank; and means for attaching the tube to at least one of the shank and the transverse member.

5. The combination of claim 4 wherein the tube is preformed to conform to the trailing edge of the shank and the transverse member for facilitating replacement of the tubes.

6. The combination of claim 5 wherein the tube has a preformed bend dividing the tube into an inlet portion and an outlet portion, the angle between the inlet portion and the outlet portion being less than 90°.

7. The combination of claim 4 further including tube protection plates mounted to substantially the entire length of the trailing edge of the transverse member to protect the tube from abrasion as a fertilizer distributor is run through soil.

8. The combination of claim 3 wherein the transverse member comprises:

a pair of legs each having a first and a second end, the first ends of the legs joined such that the legs form a planar "V"-shaped blade, the blade having a top and a bottom surface and a leading and a trailing edge, the leading edge of the blade having the apex of the "V".

9. The combination of claim 8 wherein the fertilizer distribution means comprises:

a fertilizer distribution tube with spaced ends, the distribution tube having an inlet at one end and an outlet at the other end, the tube conforming to the trailing edge of the shank and at least one leg of the blade, the outlet being proximate the second end of at least one leg away from the shank to distribute fertilizer to soil away from the shank; and means for attaching the tube to at least one of the shank and the transverse member.

10. The combination of claim 9 further including tube protection plates mounted to the trailing edge of the "V"-shaped blade to protect substantially the entire length of the tube attached to the "V"-shaped blade from abrasion as the fertilizer distributor is run through soil.

11. The adjustable attachment of claim 1, wherein the first and second engaging means are on the trailing shank edge.

12. The adjustable attachment of claim 1 wherein the first and second engaging means comprise first and second threaded bolts each having a threaded shaft with two ends, the threaded shaft having a head at one end and a free end at the other end, the first and second engaging means further comprising means for threadably securing the threaded bolts, the threadably securing means having a leading edge and a trailing edge corresponding to the leading edge and the trailing edge of the shank and the threadably securing means threadably engaging the threaded shafts of the first and second bolts such that the free end of the first bolt limits pivoting of the second shank part in the first direction and the free end of the second bolt limits pivoting of the second shank part in the second opposite direction, the heads of the first and second bolts extending from the trailing edge of the threadably securing means.

13. The attachment for mounting a tool on a tow bar of claim 12 further comprising:

a joining plate, the first shank part being fixedly attached to the joining plate and the second shank part being pivotably attached to the joining plate; and the threadably securing means being attached to the joining plate away from the pivotable attachment to the second shank part such that upon screwing the first threaded bolt into the threadably securing means the free end of the first threaded bolt engages the second shaft part pivoting it in the second opposite direction and upon screwing the second threaded bolt into the threadably securing means the free end of the second threaded bolt engages the second shaft part pivoting the second shaft part in the first direction.

14. A distribution tube for distributing an additive from an additive supply to soil, the distribution tube being attachable to a distribution implement having a vertical shank having a transverse leg for passing through a particulate matter at one end and means for attaching the vertical shank to a tool bar attached to a drawing vehicle such as a tractor at the other end, the vertical shank and the transverse leg having a leading and a trailing edge, with a means for attaching the distribution tube associated with the trailing edge, the distribution tube comprising:

a tubular body made of plastic having an inlet portion and an outlet portion at an angle to each other and divided by a preformed bend, the angle between the inlet portion and the outlet portion being less than 90°, the inlet portion having a plurality of integrally formed annular barbs for preventing separation from the inlet portion of a supply conduit attached to the inlet portion, the supply conduit being in fluid communication with the additive supply, the tubular body conforming to the trailing edge of the shank and the transverse member such that the shank and the transverse member protect the tubular body from abrasion once the distribution tube is attached to the trailing edge of the shank and the transverse member by a means for attaching and the shank and the transverse member passes through a particulate matter, the outlet portion being proximate an end of the transverse member away from the shank.

15. The distribution tube of claim 14 in combination with means for attaching the distribution tube to the trailing edge of the distribution implement.

16. The distribution tube of claim 14 in combination with a distribution implement having protection plates attached to the trailing edge of the shank and the transverse member for preventing particulate matter from abrading the tube, the tube being attachable to the trailing edge between the protection plates.

* * * * *